United States Patent [19]
Howell et al.

[11] Patent Number: 4,573,847
[45] Date of Patent: Mar. 4, 1986

[54] NUCLEAR FUEL ROD CHANNEL TRAY LOADING SYSTEM

[75] Inventors: Cecil A. Howell; Ernest R. Lacy, both of Columbia, S.C.

[73] Assignee: Westinghouse Electric Corp., Pittsburgh, Pa.

[21] Appl. No.: 522,898

[22] Filed: Aug. 12, 1983

[51] Int. Cl.$^4$ ............................................. B65G 57/18
[52] U.S. Cl. .................................. 414/63; 414/86; 414/98; 414/748; 267/136
[58] Field of Search ................ 414/63, 86, 98, 745, 414/748, 82; 53/236, 248; 206/522; 267/136; 188/266; 182/139

[56] References Cited

U.S. PATENT DOCUMENTS 2,975,855  3/1961  Dudek .................................. 182/139
3,950,920  4/1976  Thomsen et al. ...................... 414/98

FOREIGN PATENT DOCUMENTS 0077368  6/1977  Japan .................................. 414/748
0014895  2/1979  Japan .................................. 414/63

Primary Examiner—Leslie J. Paperner
Assistant Examiner—Lyle Kim
Attorney, Agent, or Firm—D. E. Erickson

[57] ABSTRACT

A system, for loading a group of elongated rods into a tray from a ramp, which includes a controllable rod stop located on the ramp, an air-tight envelope, and a tray positioning mechanism. The envelope has one end attached to the ramp's lower end and has a hole in its lower surface near the ramp's lower end. The envelope is stiff enough to self-inflate with air and to self-project its opposing end away from the ramp's lower end, when the envelope is left free. The tray positioning mechanism places the tray next to and under the envelope when the rods are to be loaded. When the rod stop is disengaged, the rods roll onto the envelope and are lowered into the tray as the weight of the rods push the air out of the envelope through its hole.

11 Claims, 6 Drawing Figures

NUCLEAR FUEL ROD CHANNEL TRAY LOADING SYSTEM

BACKGROUND OF THE INVENTION

The present invention relates generally to handling elongated rods and more particularly to a system for loading a group of nuclear fuel rods into a channel tray from a ramp.

Groups of newly manufactured nuclear fuel rods (containing fuel pellets) are loaded into channel trays for transportation between inspection stations along a nuclear fuel rod quality control inspection line. In the past, groups of such rods have been allowed to simply roll down the ramp and drop into the channel trays. What is needed is a system for the soft handling of such rods during their passage from the ramp to the bottom of the channel tray to minimize rod impact problems such as pellet fracture and tube scarring.

SUMMARY OF THE INVENTION

Briefly stated, the invention is directed towards a system for loading a group of elongated rods into a tray from a ramp. The rod loading system includes a controllable rod stop, an airtight envelope, and a tray positioning mechanism. The rod stop is located on the ramp. The envelope has one end attached to the ramp's lower end and has a hole in its lower surface near the ramp's lower end. The envelope is stiff enough to self-inflate with air and to self-project its opposing end away from the ramp's lower end, when the envelope is left free. The tray positioning mechanism places the tray next to, and under, the envelope when the rods are to be loaded. When the rod stop is disengaged, the rods roll onto the envelope and are lowered into the tray as the weight of the rods push the air out of the envelope through its hole.

BRIEF DESCRIPTION OF THE DRAWINGS

The subject matter of the invention is particularly pointed out and distinctly claimed in the concluding portion of this specification. The invention, however, both as to organization and method of operation, together with further advantages thereof, may best be understood by reference to the following description taken in connection with the accompanying drawings in which:

DETAIL DESCRIPTION OF THE INVENTION

Figure 1:
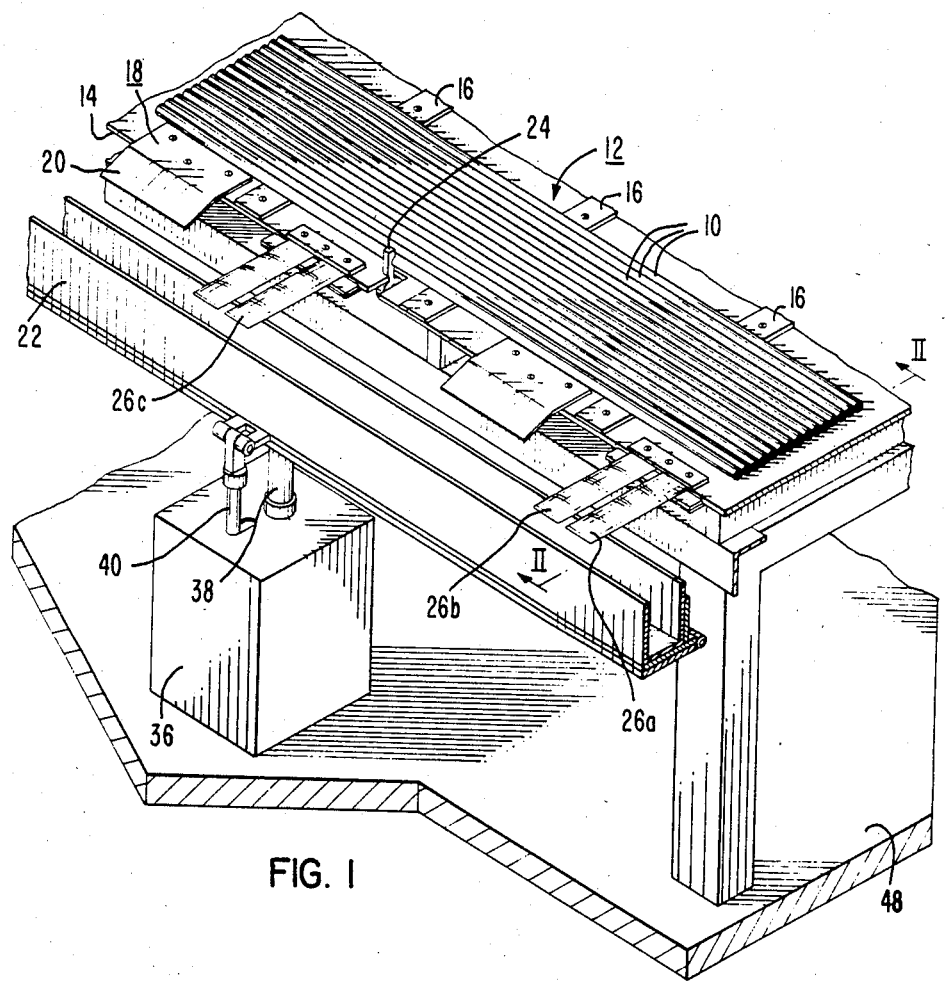
FIG. 1 is a perspective view showing a section of a nuclear fuel rod channel tray loading system of the invention.

Reference will now be made in detail to several present preferred embodiments of the invention, an example of which is illustrated in the accompanying drawings. In the drawings, like reference characters designate like or corresponding parts. A preferred embodiment of the nuclear fuel rod channel tray loading system is shown in FIG. 1, with details of its operation shown in FIGS. 2 through 5. A group of elongated rods, such as nuclear reactor fuel rods 10, has been transferred by rod handling equipment (not shown in the figures) to an inclined ramp 12. The system of the invention gently loads the group of rods 10 into a tray, preferably one having a depth sufficient enough to hold more than one layer of rods, such as a nuclear fuel rod channel tray 22.

The rod tray loading system includes a rod stop 24 located on the ramp 12. The rod stop 24 has an engaged position (see FIGS. 2 and 5) which blocks the rods 10. Preferably two or more spaced-apart rod stops are employed to hold the rods on the ramp. The rod stop 24 also has a disengaged position (see FIGS. 3 and 4) which releases the rods 10 to roll towards the ramp's lower terminus 14. The rod stop 24 is controllable and can be actuated/deactuated by electrical, pneumatic or hydraulic controllers, and the like, as is known to those skilled in the art. Preferably the rods 10 roll on raised, spaced-apart ramp rails 16 onto similarly raised, spaced-apart ramp platforms 18 located at the ramp's lower terminus 14. It is desirable that the platforms 18 have downward sloping extensions 20 which help bridge any gap between the ramp 12 and the tray 22 when the rods 10 are to be loaded.

Figure 6:
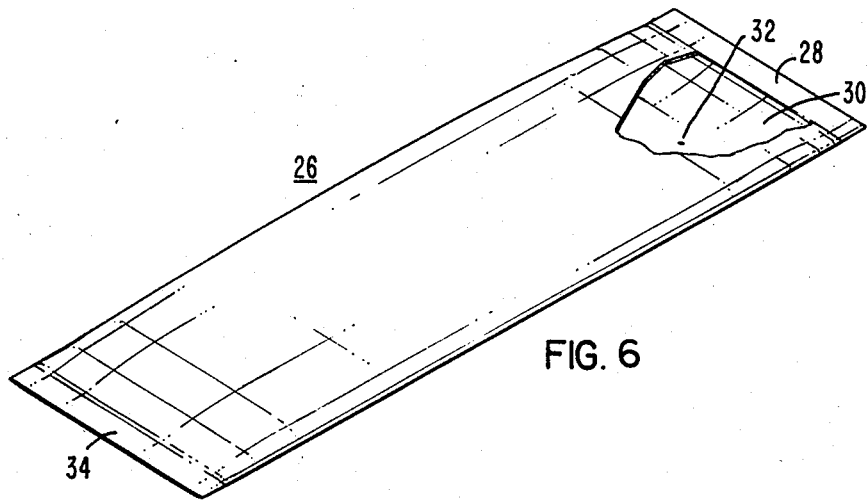
FIG. 6 is a perspective view of the envelope of the system shown in FIG. 1, with a portion cut away showing the hole in the lower surface.
Figure 2:
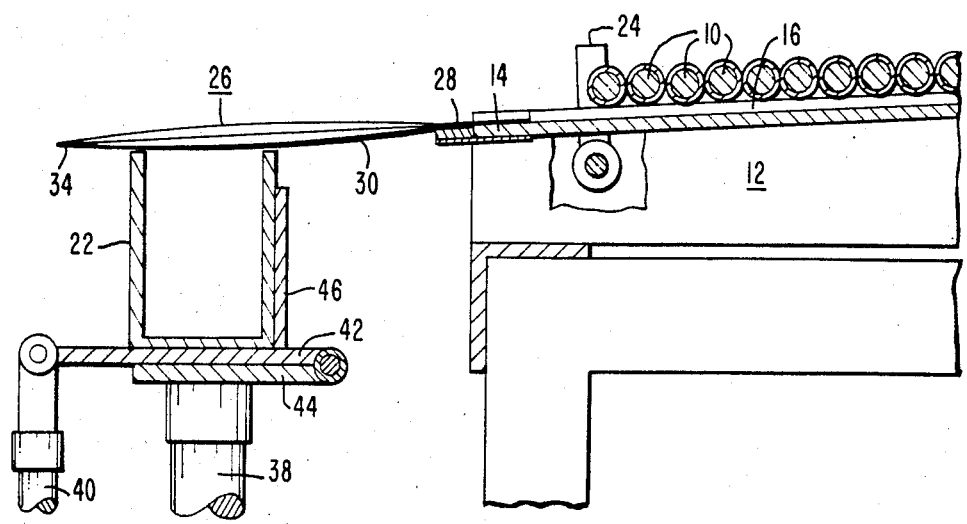
FIG. 2 is a sectional view taken along the lines II—II of FIG. 1 with the tray in the raised horizontal position.
Figure 3:
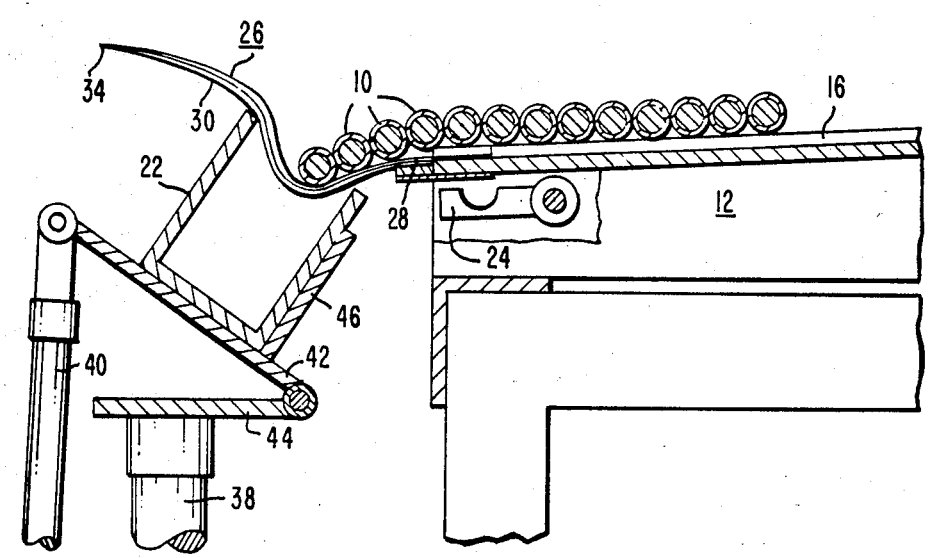
FIG. 3 is identical to FIG. 2 but with the tray in the tilted position.
Figure 4:
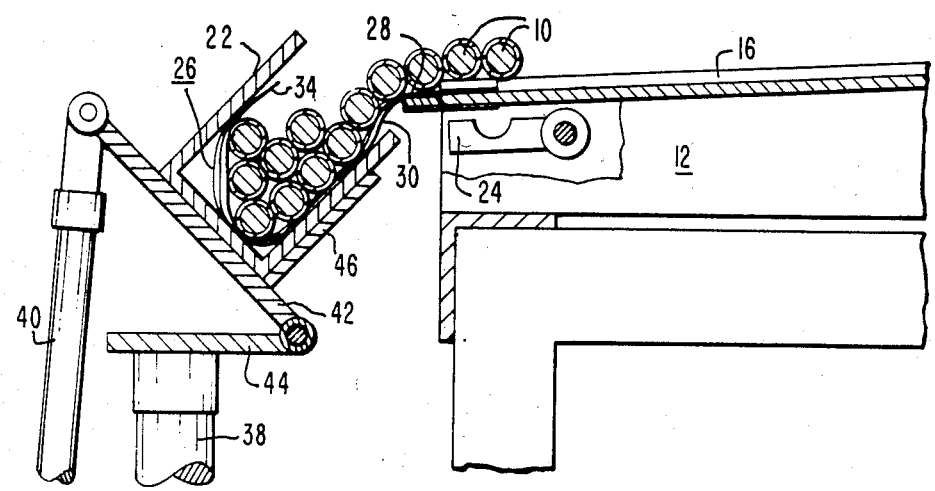
FIG. 4 is identical to FIG. 3 but with the tray loaded with nuclear fuel rods.
Figure 5:
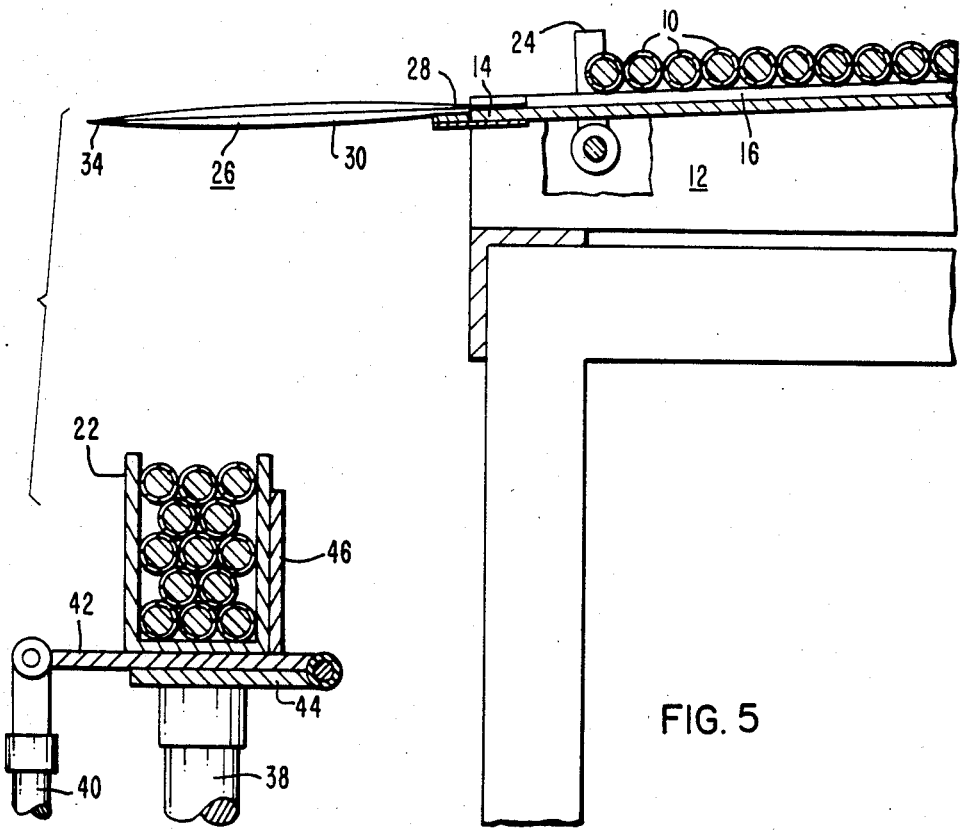
FIG. 5 is identical to FIG. 4 but with the tray in the lowered horizontal position.

A hermetically-sealed envelope 26 (seen alone in greater detail in FIG. 6) containing air of generally atmospheric pressure provides the desired rod cushioning effect during their loading into the tray 22. The envelope 26 has two generally opposing ends 28 and 34. One end 28 is connected to the ramp 12 near its lower terminus 14. The lower surface 30 of the envelope 26 has a hole 32 near the ramp's lower terminus 14. The envelope 26 is made of a material which has a stiffness sufficient to atmospherically self-inflate the envelope 26 when the envelope is not burdened by overlying rods 10 (and the like) and sufficient to self-project its other end 34 generally away from the ramp's lower terminus 14 at a preselected distance when the envelope is not encumbered by the rods 10 or the tray 22 (and the like).

Preferably, the envelope 26 is of generally rectangular configuration and has a generally biconvex shape, when self-inflated. Suitable materials for making the envelope 26 include 6 mil polyethylene tube material or polypropylene, and the like, as is known to those skilled in the art. The size and number of holes 32 may be adjusted to achieve the desired cushioning effect, as can be appreciated by those skilled in the art. Although a single envelope 26a, if of sufficient width, could achieve the desired rod cushioning, it is preferable to include a number (at least one) of other such envelopes (such as 26c) which are grouped apart from each other and from the original envelope 26a. It also is desirable to include a number (at least one) of additional such envelopes (such as 26b) which are grouped together with each other and with the original envelope 26a.

The previously mentioned preselected distance which the envelope self-projects when unencumbered is chosen such that the envelope 26 will span the tray 22 when the tray 22 is in position to be loaded with the rods 10 and such that the envelope 26 will provide a cushioning effect of the rods 10 as they enter the tray 22, as can be appreciated by those skilled in the art. Preferably, the preselected distance is greater than the width of the tray plus the height of the tray.

Means are provided for disposing the tray 22 generally adjacent to, and underneath, the envelope 26, when the rods 10 are to be loaded into the tray 22. When the rod stop 24 is disengaged, the rods 10 roll from the ramp 12 onto the envelope 26 pushing the envelope 26 into contact with the tray 22. The rods 10 are lowered to the bottom of the tray 22 as the weight of the rods 10 push the air out of the envelope 26 through its hole 32.

Preferably, the tray disposing means includes a life 36 (supported by the floor 48 of the plant) having a tray raising piston 38 powered electrically, hydraulically, or pneumatically, and the like, but the tray disposing means could include any conventional materials handling apparatus, including the use of robots, as is known to those skilled in the art. It is desirable that the tray disposing means, such as the lift 36, also position the tray 22 a distance away from the ramp's lower terminus 14 sufficient for the tray 22 to be pulled free of the envelope 26 when the rods 10 have been loaded into the tray 22 on top of the envelope 26. The lowering of the lift 36 a distance below the ramp's lower terminus 14 greater than the envelope's length generally will be sufficient to free the envelope 26 allowing it to self-inflate and self-project as it awaits the next group of rods 10. In one embodiment of the invention, the lift 36 positions the tray 22 generally horizontally when the rods 10 are being loaded into the tray 22.

In a preferred embodiment of the invention, the tray disposing apparatus also includes means for tilting the tray 22 at a generally predetermined angle (a desirable angle being generally 45°) from a generally horizontal position towards the ramp's lower terminus 14 when the rods 10 are being loaded into the tray 22 and for returning the tray 22 to a generally horizontal position when the rods 10 have been loaded into the tray 22. Preferably, the tray tilting means includes a tray tilting piston 40 having its upper end attached to a hinged tray support's top member 42 while the tray raising piston 38 has its upper end attached to the hinged tray support's bottom member 44. When the tray 22 is tilted, it also is supported by a tray support side wall 46 which is attached to the tray support's rotatable top member 42. Other tray tilting means include conventional materials handling apparatus, including the use of robots, as is known to those skilled in the art.

In operation, the tray 22 starts in a lowered horizontal position with the group of rods 10 blocked by the rod stop 24 on the ramp 12. The tray raising piston 38 then positions the tray 22 generally horizontally underneath, and adjacent to, the envelope 26 (see FIG. 2). Next, the tray tilting piston 40 rotates the tray 22 generally 45° towards the ramp's lower terminus 14, and the rod stop 24 then releases the rods 10 (see FIG. 3). The rods 10 are cushioned as they roll onto the envelope 26 forcing it into contact with the tray 22. The weight of the rods 10 forces the air out of the envelope 26 through its hole 32, gently lowering the rods 10 to the bottom of the tray 22 (see FIG. 4). The tray tilting piston 40 then returns the loaded tray 22 to a horizontal position, and the tray raising piston 38 then lowers the loaded tray 22 releasing the envelope 26 which self-inflates and self-projects to await the next group of rods (see FIG. 5).

It will be apparent that many modifications and variations are possible in light of the above teachings. It, therefore, is to be understood that within the scope of the appended claims, the invention may be practiced other than as specifically described.

We claim:

1. A system for loading a group of elongated rods into a tray from an inclined ramp having a lower terminus, comprising:
   (a) a controllable rod stop disposed on said ramp, said stop having an engaged position which blocks said rods and a disengaged position which releases said rods;
   (b) a hermetically-sealed envelope containing air of atmospheric pressure and having two generally opposing ends with one of said ends attached to said ramp proximate said ramp's lower terminus, said envelope also having a lower surface with a hole proximate said ramp's lower terminus, with said envelope being of sufficient stiffness to atmospherically self-inflate, when unburdened, and to self-project its other of said two ends generally away from said ramp's lower terminus at a preselected distance, when unencumbered; and
   (c) means for disposing said tray generally adjacent to, and underneath, said envelope, when said rods are to be loaded into said tray, for said rods to roll from said ramp onto said envelope pushing said envelope into contact with said tray, when said stop is disengaged, and for said envelope to lower said rods to the bottom of said tray as air is pushed out of said hole of said envelope by the weight of said rods thereon.

2. The system of claim 1, wherein said envelope has a generally biconvex shape, when self-inflated.

3. The system of claim 1, wherein said disposing means disposes said tray generally horizontally when said rods are to be loaded into said tray, wherein the other of said two ends of said envelope self-projects generally horizontally when unencumbered, and wherein said preselected distance is greater than the width of said tray plug the height of said tray.

4. The system of claim 1, wherein said rods are nuclear reactor fuel rods and said tray has a sufficient depth to accommodate more than one layer of said rods.

5. The system of claim 1, wherein said envelope has a generally rectangular configuration.

6. The system of claim 1, also including a number of other said envelopes, said other envelopes grouped apart from each other and from said envelope, with said number being at least one.

7. The system of claim 1, also including a number of additional said envelopes, said additional envelopes grouped together with each other and with said envelope, with said number being at least one.

8. The system of claim 1, wherein said disposing means also disposes said tray a sufficient distance away from said ramp's lower terminus such that said tray is pulled free of said envelope, when said rods have been loaded into said tray on top of said envelope.

9. The system of claim 8, wherein said disposing means includes a lift.

10. The system of claim 1, wherein said disposing means also includes means for tilting said tray at a generally predetermined angle from a generally horizontal position towards said ramp's lower terminus when said rods are to be loaded into said tray, and for returning said tray to said generally horizontal position when said rods have been loaded into said tray.

11. The system of claim 10, wherein said predetermined angle is generally 45°.

* * * * *